United States Patent
Salyer et al.

(10) Patent No.: US 8,522,920 B1
(45) Date of Patent: Sep. 3, 2013

(54) ANY TREE HANGING TREE STAND

(76) Inventors: Eddie L. Salyer, Dublin, TX (US); Tom J Brooks, Stephenville, TX (US)

(*) Notice: Subject to any disclaimer, the term of this patent is extended or adjusted under 35 U.S.C. 154(b) by 567 days.

(21) Appl. No.: 12/211,091

(22) Filed: Sep. 15, 2008

Related U.S. Application Data

(60) Provisional application No. 60/972,367, filed on Sep. 14, 2007.

(51) Int. Cl.
*E04G 3/24* (2006.01)

(52) U.S. Cl.
USPC .......................................... 182/188; 182/187

(58) Field of Classification Search
USPC .................. 182/133–136, 187, 188
See application file for complete search history.

(56) References Cited

U.S. PATENT DOCUMENTS

| | | | | |
|---|---|---|---|---|
| 5,297,656 A * | 3/1994 | Amacker | ....................... | 182/187 |
| 6,102,158 A * | 8/2000 | Winschel | ....................... | 182/187 |
| 6,336,520 B1 * | 1/2002 | Amacker | ....................... | 182/187 |
| 6,571,916 B1 * | 6/2003 | Swanson | ....................... | 182/187 |
| 6,866,120 B1 * | 3/2005 | Butterworth | ....................... | 182/187 |
| 7,021,423 B1 * | 4/2006 | Pestrue et al. | ................ | 182/116 |
| 7,036,632 B1 * | 5/2006 | Price | ............................. | 182/187 |
| 2007/0261919 A1 * | 11/2007 | Roe | ............................... | 182/187 |

OTHER PUBLICATIONS

The American Heritage® Dictionary of the English Language, Fourth Edition copyright ©2000 by Houghton Mifflin Company. Updated in 2009. Published by Houghton Mifflin Company. All rights reserved. Definition provided in office action. Downloaded from http://www.thefreedictionary.com/seat.*

* cited by examiner

*Primary Examiner* — Alvin Chin Shue
*Assistant Examiner* — Daniel Cahn
(74) *Attorney, Agent, or Firm* — Katarzyna Brozynski; David G. Henry

(57) ABSTRACT

A tree stand that contains a y-axis frame adjustable along the y-axis, x-axis frame adjustable along the x-axis, and z-axis frame adjustable along the z-axis. In use, at least one securing strap secures the y-axis frame to a tree. To adjust the y-axis frame along the y-axis, the securing strap is loosened and the y-axis frame can be repositioned almost anywhere along the tree that will support the tree stand. To adjust the x-axis frame along the x-axis, the x-axis frame can be rotated around a rotational support means on the y-axis. To adjust the z-axis frame along the z-axis, a z-axis frame support is attached to the x-axis and connects to one of at least two z-axis adjustment means on the x-axis.

2 Claims, 4 Drawing Sheets

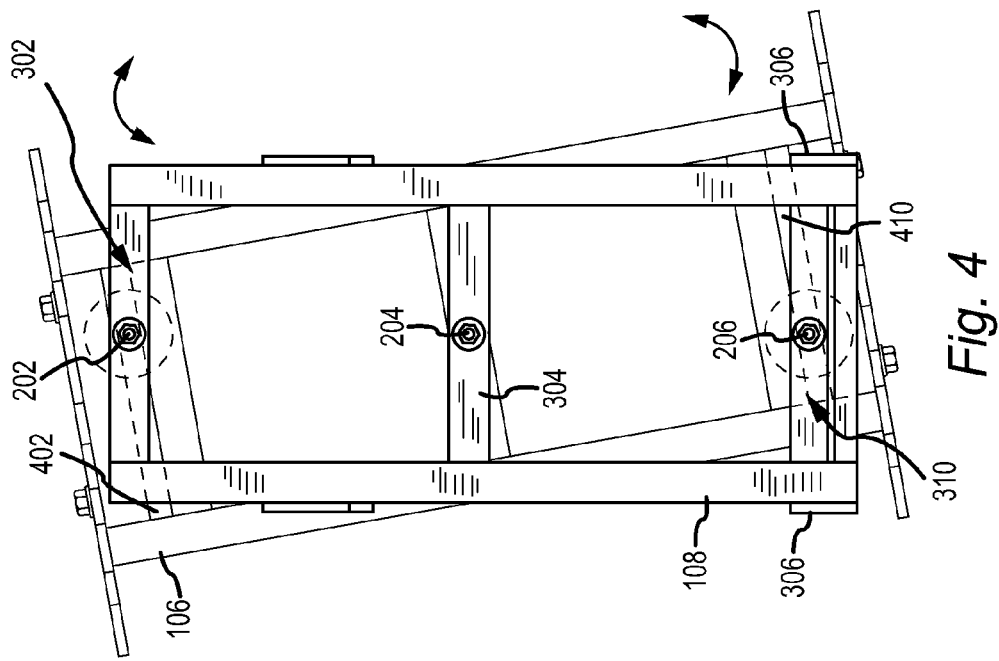
*Fig. 4*
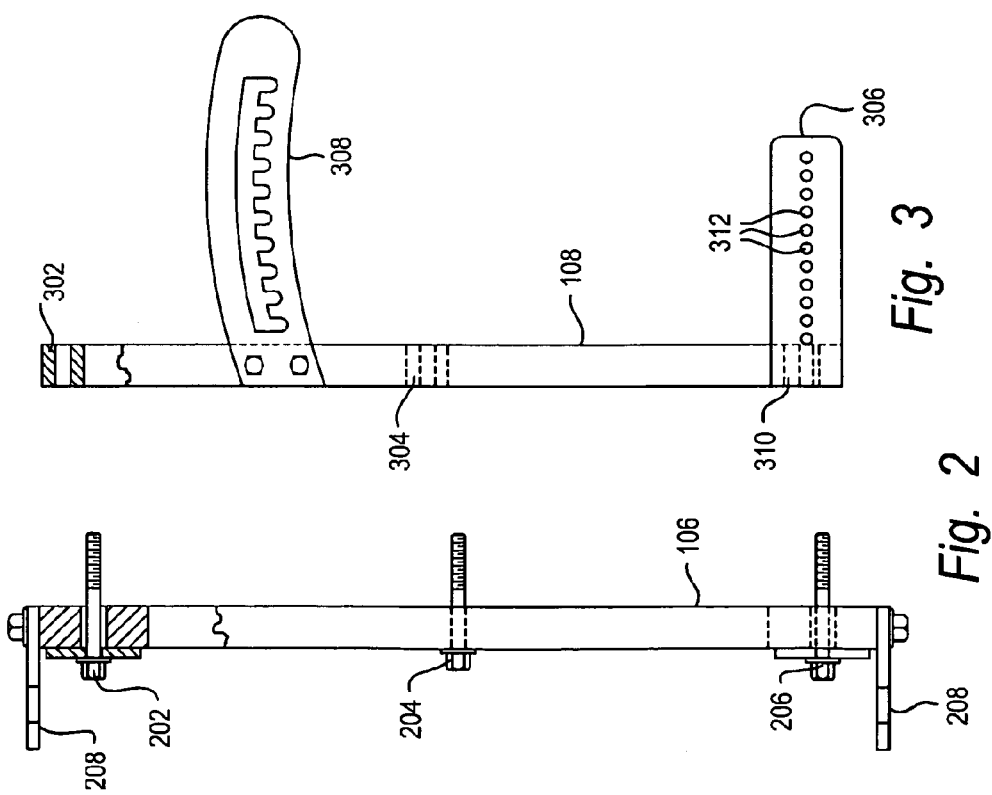
*Fig. 3*
*Fig. 2*

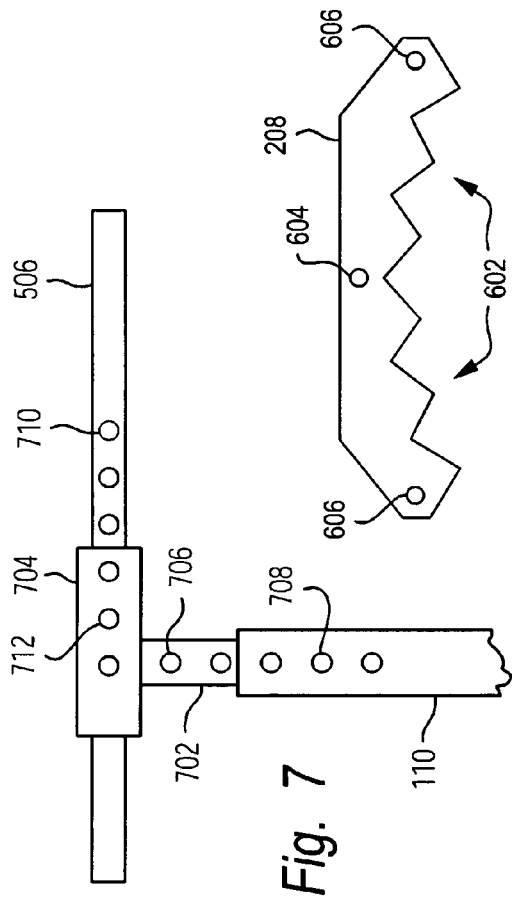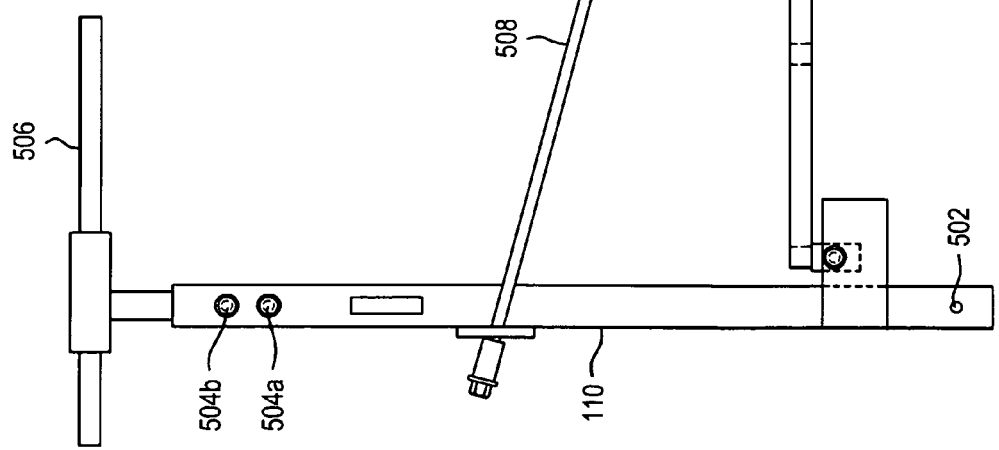

ANY TREE HANGING TREE STAND

CLAIM OF PRIORITY

This application claims the benefit of U.S. Provisional Application No. 60/972,367 filed Sep. 14, 2007 which is incorporated herein by reference.

BACKGROUND OF THE INVENTION

1. Technical Field

The invention relates to a tree stand for use in supporting a hunter or outdoor enthusiast above the ground. More specifically, the invention relates to a tree stand that is adjustable in three dimensions allowing for the leveling of the tree stand while secured to a tree.

2. Description of Related Art

Tree stands are known by hunters and nature enthusiasts to allow the user an elevated position above the ground, away from the animals desired to be observed by the user. Typically, a tree stand is placed close to animal trails or near a location where the desired animal has left scrape marks, has been rubbing up against trees and brush, or has been feeding from an animal feeder. The location of the tree stand is critical to allow a clear shot or view of the animal. However, often when hanging a tree stand, a problem arises about whether or not a straight level tree can be found to position the tree stand in the appropriate location. Unfortunately, nature is often not cooperative and most trees grow at a slant for various reasons such as slope of the ground, access to sunlight, or other environmental factors. What is needed is a tree stand that allows for adjustment to compensate for a slanting tree. It would be especially beneficial if the tree stand could be adjusted in multiple dimensions along the x, y, and z axes.

SUMMARY OF INVENTION

The present invention solves the above-described problem by providing a tree stand that contains a y-axis frame, x-axis frame, and z-axis frame. In use, at least one securing strap secures the y-axis frame to a tree. In one embodiment more than one securing strap is used. The y-axis frame is secured to a tree using the securing strap and the y-axis frame is proximate to and generally follows the slope or pitch of the trunk of tree. To adjust the y-axis frame along the y-axis, the securing strap is loosened and the y-axis frame can be repositioned almost anywhere along the tree that will support the tree stand.

The y-axis frame contains a first support means and a rotational support means. In one embodiment the y-axis frame contains a second support means. The first support means and rotational support means are used to secure the x-axis frame to the y-axis frame. The first support means and rotational support means may be a bolt, screw, or some other device that will allow the x-axis frame to be rigidly secured to the y-axis frame.

The x-axis frame contains a first support means channel, rotational support attachment, z-axis frame floor support, and z-axis frame seat support. If the y-axis frame contains a second support means, then the x-axis frame contains a corresponding second support means channel. The first support means channel extends from one side of the x-axis frame to the opposite side of the x-axis frame. The first support means channel is wide enough to allow the first support means to pass through it yet is narrow enough to allow the first support means to become secured to the first support means channel. For example, the first support means may be a bolt or pin that can pass through the first support means channel and then secured to the first support means channel by a cotter pin, clevis pin, washer and nut, or some other means that would secure the x-axis frame to the y-axis frame and prevent the movement of the x-axis frame.

The rotational support attachment is proximate to the center of the x-axis frame. and is wide enough to allow the rotational support means to pass through it yet narrow enough to allow the rotational support means to become secured to the rotational support attachment. The rotational support means may be secured to the rotational support attachment by a cotter pin, clevis pin, washer and nut, or some other means that would secure the x-axis frame to the y-axis frame yet when loose, would allow the x-axis frame to rotate around the rotational support means and when tighten would prevent the movement of the x-axis frame.

To adjust the x-axis frame along the x-axis, the first support means is loosened and the x-axis frame can be repositioned by rotating the x-axis frame around the rotational support means. The first support means is allowed to slide in first support means channel such that it is relatively easy to rotate the x-axis frame around the rotational support means. The amount or degree that the x-axis frame can be rotated around rotational support means depends on the length of x-axis frame and the length of first support means channel. In one embodiment, the x-axis frame can be rotated approximately 15 degrees left or right from the vertical center of the y-axis frame.

The z-axis frame contains a floor, receiver for the z-axis frame floor support, and at least two z-axis adjustment means wherein the z-axis frame seat support may be attached to one of the adjustment means. The floor support and the z-axis frame seat support secure the z-axis frame to the x-axis frame. In one embodiment, the z-axis frame contains a seat to allow a user to sit when using the tree stand. In another embodiment, the z-axis frame contains a retaining cord.

To secure the z-axis frame to the x-axis frame, the z-axis frame floor support is secured to the z-axis frame via a z-axis securing means. The securing means may be a bolt, screw, or some other device that will allow the z-axis frame floor support to be rigidly secured to the z-axis frame. In one embodiment, to adjust the z-axis frame along the z-axis, the z-axis frame seat support is attached to one of the at least two z-axis adjustment means. For example, if the z-axis frame needs to be moved up along the z-axis, then the z-axis frame seat support is removed from one of the at least two z-axis adjustment means and is secured to one of the at least two z-axis adjustment means that is higher than the original one. In one embodiment, the seat of the z-axis frame may be adjusted approximately 5 degrees backward for trees that are leaning forward and approximately 10 to 15 degrees forward for trees that are leaning away. In one embodiment, the seat is adjustable in height and will move forward and back for greater comfort.

To use the tree stand, first a tree is located where the stand will be located. Then the y-axis frame is pulled up to the level it will be located on the tree and adjustment along the y-axis is made as described above. Next, the y-axis frame is secured to the trunk of the tree with the securing straps. Then the x-axis frame is positioned over the rotational support means and first support means. The x-axis frame is rotated about the rotational support means until it is properly adjusted along the x-axis. Once the x-axis frame is adjusted along the x-axis, rotational support means and first support means are used to rigidly secure the x-axis frame to the y-axis frame. Next, the z-axis frame is positioned on the x-axis frame using z-axis frame floor support to support the z-axis frame. Then, using the z-axis adjustment means, the floor of the z-axis frame is tilted forward or away from the tree to adjust the z-axis frame along the z-axis. When the floor is properly aligned along the z-axis, the z-axis frame is rigidly secured to the x-axis frame. In one embodiment, once everything is level and properly orientated along the y, x, and z axis, the seat is adjusted forward or backward depending on the desired closeness of the seat the tree. In addition, sliding the seat back will give additional leg and foot room on the platform.

Often when in a tree stand, long hours and possible extreme conditions make it necessary to be comfortable. The tree stand can be leveled along the x, y, and z axis for comfort reducing stress on the supporting muscles of the user, most notably the back muscles and gluteus. The seat is adjustable both in height for short and tall people and adjustable forward and backward for more comfort in the legs and gluteus region and results in having a less compressive force placed on the lumbar spine.

BRIEF DESCRIPTION OF THE DRAWINGS

FIG. 2 is a side view of a y-axis frame of the tree stand in accordance with an embodiment of the present invention.

FIG. 3 is a side view of a x-axis frame of the tree stand in accordance with an embodiment of the present invention.

FIG. 4 is front view showing the adjustment of the x-axis frame along the x-axis in accordance with an embodiment of the present invention.

FIG. 5 is a side view of a z-axis frame of the tree stand in accordance with an embodiment of the present invention.

FIG. 6 is a front view of a tree member in accordance with an embodiment of the present invention.

FIG. 7 is a side view of the seat of the tree stand in accordance with an embodiment of the present invention.

DETAILED DESCRIPTION OF THE INVENTION

Figure 1:
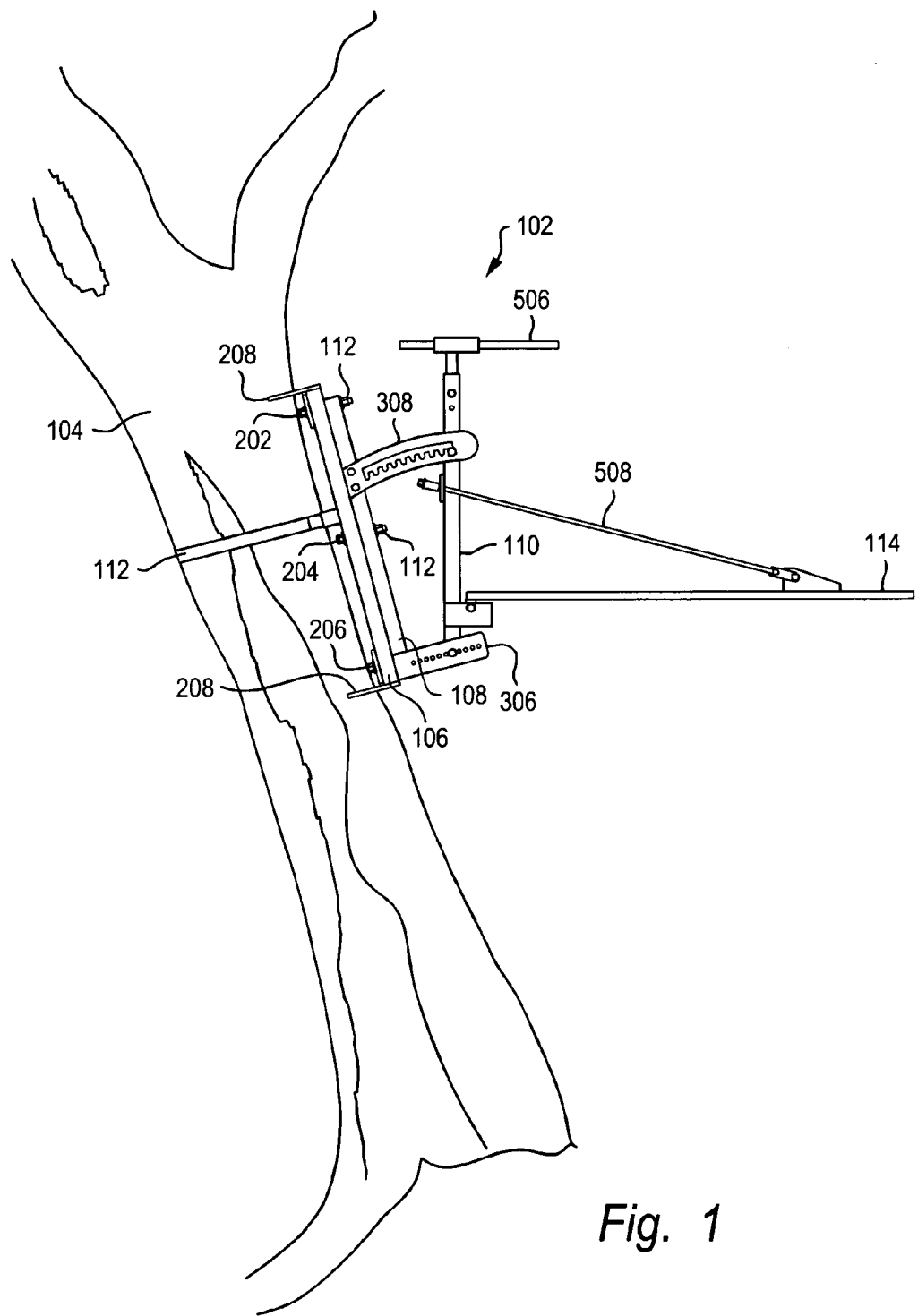
FIG. 1 is an profile view of a tree stand in accordance with an embodiment of the present invention.
Figure 8:
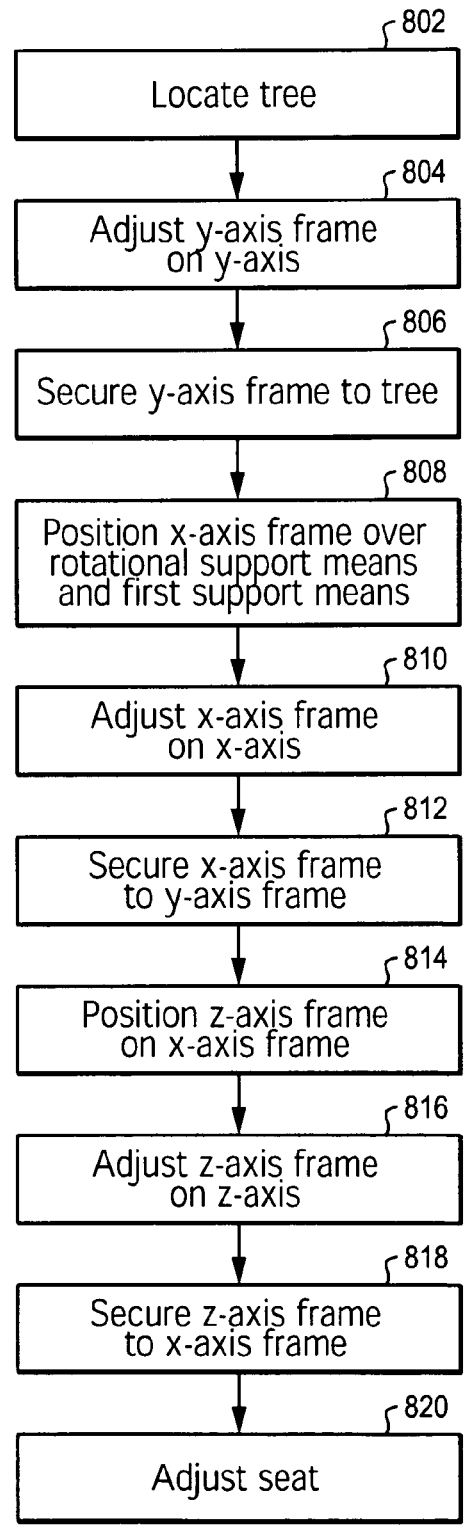
FIG. 8 is a block diagram depicting the steps used to install the tree stand in accordance with an embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

Referring to FIG. 1, shown is tree stand 102 attached to tree 104. Tree stand 102 contains y-axis frame 106, x-axis frame 108, z-axis frame 110, at least one securing strap 112, and floor 114. At least one securing strap 112 secures y-axis frame 106 to tree 104. Securing strap 112 may contain a ratchet mechanism or some other similar type mechanism that will allow securing strap 112 to secure y-axis frame 106 to tree 104. In one embodiment more than one securing strap 112 is used. Y-axis frame 106 is shown in more detail in FIG. 2.

As shown in FIG. 2, a y-axis frame 106 contains first support means 202 and rotational support means 204. In one embodiment, y-axis frame 106 contains at least two support means 202. FIG. 2 shows second support means 206. In another embodiment, y-axis frame 106 contains member 208. Tree member 208, shown in more detail in FIG. 6, contains serrated edge 602, adjust means 604, and securing strap attachment 606. Tree member 208 is fixedly attached to y-axis frame 106. Serrated edge 602 is serrated and allows tree member 208 to dig into tree 104 and helps secure y-axis frame 106 to tree 104. Adjustment means 604 may be a hinge or pivot point where tree member 208 can be opened and closed (the latter not shown on FIG. 6) to conform to the diameter of tree 104. For example, if tree 104 has a large diameter, then tree member 208 may be opened relatively wide to accommodate the large diameter of tree 104. One of ordinary skill in the art at the time of the invention was made can understand the adjustable feature of a tree member (being more opened or closed) to accommodate the changing diameter of the tree. In one embodiment, securing straps 112 are attached to securing strap attachment 606.

When y-axis frame 106 is secured to tree 104 by securing strap 112, y-axis frame 106 is proximate to and generally follows the slope or pitch of the trunk of tree 104. To adjust y-axis frame 106 along the y-axis, securing strap 112 is loosened and y-axis frame can be repositioned almost anywhere along tree 104 that will support tree stand 102. First support means 202 and rotational support means 204 are used to secure x-axis frame 108 to y-axis frame 106. First support means 202 and rotational support means 204 may be a bolt, screw, or some other device that will allow x-axis frame 108 to be secured to y-axis frame 106. X-axis frame 108 is shown in more detail in FIG. 3.

As shown in FIG. 3, x-axis frame 108 contains first support means channel 302, rotational support attachment 304, z axis frame floor support 306, and z-axis frame seat support 308. If y-axis frame 106 contains second support means 206 or multiple support means 202, then x-axis 108 contains a corresponding second support means channel 310. In the interest of clarity and conciseness, only the first support means channel 302 will be described however, it is to be understood that if more than one support means channel 302 is present, then each support means channel 302 will have the same characteristics. First support means channel 302 extends from one side of x-axis frame 108 to the opposite side of x-axis frame 108. First support means channel 302 is wide enough to allow first support means 202 to pass through and slide inside it, yet narrow enough to allow first support means 202 to become secured to first support means channel 302. First support means 202 may be secured to first support means channel 302 by a cotter pin, clevis pin, washer and nut, or some other means that would secure z-axis frame 108 to y-axis frame 106 and prevent the movements of x-axis frame 108.

Rotational support attachment 304 is proximate to the center of x-axis frame 108. Rotational support attachment 304 is wide enough to allow rotational support means 204 to pass through it yet narrow enough to allow rotational support means 204 to become secured to rotational support attachment 304. Rotational support means 204 may be secured to rotational support attachment 304 by a cotter pin, clevis pin, washer and nut, or some other means that would secure x-axis frame 108 to y-axis frame 106 yet when loose would allow x-axis frame 108 to rotate around rotational support means 204 and when tighten would prevent the movement of x-axis frame 108.

To adjust x-axis frame 108 along the x-axis, first support means 202 is loosened and x-axis frame can be repositioned by rotating x-axis frame 108 around rotational support means 204. The amount or degree that x-axis frame 108 can be rotated around rotational support means 204 depends on the length of x-axis frame 108 and the length of first support means channel 302. In one embodiment, the x-axis frame 108 can be rotated approximately 15 degrees left or right from the vertical center of y-axis frame 106.

In one embodiment, as shown in FIG. 4, first support means channel 302 and, if present, second support means channel 310 of the x-axis frame are located on the y-axis frame 106 (shown in FIG. 4 as 402 and 410, respectively). First support means 202 and second support means 206 slide inside and along first support means channel 302 and second support means channel 310 respectively such that the x-axis frame 108 can be rotated left or right from the vertical center of y-axis frame 106.

As shown in FIG. 5, z-axis frame 110 contains floor 114, receiver 502 for z-axis frame floor support 306, and at least two z-axis adjustment means 504 wherein z-axis frame seat support 308 may be attached to one of the adjustment means 504. Z-axis frame floor support 306 and z-axis frame seat support 308 secure z-axis frame 110 to x-axis frame 108. In one embodiment, z-axis frame 110 contains seat 506. In another embodiment, z-axis frame 110 contains retaining cord 508.

To secure z-axis frame 110 to x-axis frame 108, z-axis frame floor support 306 is secured to z-axis frame 110 via receiver 502. The securing means may be a bolt, screw, or some other device that will allow z-axis frame floor support 306 to be secured to z-axis frame 110. To adjust z-axis frame 110 along the z-axis, z-axis frame seat support 308 is attached to one of the at least two z-axis adjustment means 504. For example, if z-axis frame 110 needs to be moved up along the z-axis, then z-axis frame seat support 308 is removed from z-axis adjustment means 504a and is secured to z-axis adjustment means 504b that is located higher than z-axis adjustment means 504a.

Seat adjustment, shown in FIG. 7 contains vertical adjustment means 702, horizontal adjustment means 704, first vertical securing means 706, second vertical securing means 708, first horizontal securing means 710, and second horizontal securing means 712. To adjust seat 506 vertically, vertical adjustment means 702 is slid up and down inside z-axis frame 110 until the desired vertical alignment is obtained. Once the vertical alignment is obtained, a bolt, cotter pin, clevis pin, washer and nut, or some other means is used that would secure vertical adjustment means 702 to z-axis frame 110. If a bolt or some other similar device is used, the bolt is inserted into second vertical securing means 708 and passes through first vertical securing means 706 and out the other side of z-axis frame 110 thereby adjusting seat 506 horizontally.

To adjust seat 506 horizontal, horizontal adjustment means 704 is slid inside and out of vertical adjustment means 702 until the desired horizontal alignment is obtained. Once the horizontal alignment is obtained, a bolt, cotter pin, clevis pin, washer and nut, or some other means is used that would secure horizontal adjustment means 704 to vertical adjustment means 702. If a bolt or some other similar device is used, the bolt is inserted into second horizontal securing means 712 and passes through first horizontal securing means 710 and out the other side of vertical adjustment means 702 thereby adjusting seat 506 vertically.

To use three stand 102, first a tree is located where the stand will be located, Step 802. Then y-axis frame 106 is pulled up to the level it will be located on tree 104 and adjustment along the y-axis is made as described above, Step 804. Next, y-axis frame 106 is secured to the trunk of tree 104 with the securing straps 112, Step 806. Then, x-axis frame 108 is positioned over rotational support means 204 and first support means 202, Step 808. Next, x-axis frame 108 is rotated about rotational support means 204 and first support means 202, Step 810. Once x-axis frame 108 is adjusted along the x-axis, rotational support means 204 and first support means 202 are used to secure x-axis frame 108 to y-axis frame 106, Step 812. Next, z-axis frame 110 is positioned on x-axis frame 108 using z-axis frame floor support 306 to support z-axis frame 110, Step 814. Then using the z-axis adjustment means, floor 114 of z-axis frame is tilted forward or away from tree 104 to adjust z-axis frame 110 along the z-axis, Step 816. When floor 114 is properly aligned along z-axis, z-axis frame 110 is secured to x-axis frame 108, Step 818. In one embodiment, once everything is level and properly oriented along x, y, and z-axis, seat 506 is adjusted forward or backward depending on the desired closeness of the seat to tree 104, Step 820. In addition, sliding seat 506 towards tree will give additional leg and foot room on the floor 114.

It should be understood that the foregoing relates to exemplary embodiments of the invention and that modifications may be made without departing from the spirit and scope of the invention as set forth in the following claims.

What is claimed is:

1. A tree stand that can be adjusted in an x, y, and z plane, the tree stand comprising:
   a y-axis frame capable of being removably secured along a tree, an x-axis frame directly connected to the y-axis frame, and a z-axis frame directly connected to the x-axis frame;
   the y-axis frame comprising a first rectangular frame having a first left vertical rail, a first right vertical rail, a first bottom horizontal rail, a first middle horizontal rail and a first top horizontal rail, the first left vertical rail is parallel to the first right vertical rail, the first bottom horizontal rail is parallel to the first middle and top horizontal rails so that the first bottom, middle and top horizontal rails respectively directly connect the first left vertical rail and the first right vertical rail, a center of the first middle horizontal rail has a first aperture, the first top horizontal rail has a first channel that extends from the first left vertical rail to the first right vertical rail and the first bottom horizontal rail has a second channel that extends from the first left vertical rail to the first right vertical rail, a top end of the first top horizontal rail is directly attached to a first u-shaped top tree member having a serrated edge that allows the top tree member to dig into the tree, a bottom end of the first bottom horizontal rail is directly attached to a second u-shaped bottom tree member having a serrated edge that allows the bottom tree member to dig into the tree, the y-axis frame is also directly attached to a securing strap capable of removably securing the y-axis frame to the tree;
   the x-axis frame comprising a second rectangular frame having a second left vertical rail, a second right vertical rail, a second bottom horizontal rail, a second middle horizontal rail and a second top horizontal rail, the second left vertical rail is parallel to the second right vertical rail, the second bottom horizontal rail is parallel to the second middle and second top horizontal rails so that the second bottom, middle and top horizontal rails respectively directly connect the second left vertical rail and the second right vertical rail, a center of the second middle horizontal rail has a second aperture, the second left vertical rail is directly attached to a curved left seat support rail having a left seat support groove forming a plurality of notches, the second right vertical rail is directly attached to a curved right seat support rail having a right seat support groove forming a plurality of notches, below the curved left seat support rail is a left floor support rail that is directly attached to a bottom of the second left vertical rail, the left floor support rail having a plurality of floor support apertures, below the curved right seat support rail is a right floor support rail that is directly attached to a bottom of the second right vertical rail, the right floor support rail having a plurality of floor support apertures, the floor support rails and the curved seat support rails extend orthogonally away from the second vertical rails;

the z-axis frame comprising at least one tubular vertical rail, at a top end of the at least one tubular vertical rail is a plurality of seat holes and a seat that has a vertical seat rail slidably positioned within the at least one tubular vertical rail so that a height of the seat can be secured and adjusted with respect to the at least one tubular vertical rail via the plurality of seat holes, the seat further comprising a horizontal tubular rail directly and orthogonally attached to the vertical seat rail, the horizontal tubular rail has a second horizontal seat rail slidably positioned within for horizontal adjustability of the seat, at a bottom end of the at least one tubular vertical rail is a receiver hole situated below a floor directly attached to the at least one tubular vertical rail, the floor extends orthogonally to the at least one tubular vertical rail;

the y-axis frame is directly connected to the x-axis frame via a first, second and third bolt, the first bolt passes through the first and second apertures of the first and second middle horizontal rails, the second bolt passes through the first and second top horizontal rails and the third bolt passes through the first and second bottom horizontal rails, the x-axis frame can pivot with respect to the y-axis frame about the first bolt so that the x-axis frame and y-axis frame rotate within two planes parallel to each other during rotation; the at least one tubular vertical rail is directly connected to at least one of the seat support grooves so that the at least one tubular vertical rail can be adjustably secured along a corresponding plurality of notches, the receiver hole is directly attached to one of the plurality of floor support apertures of one of the floor support rails so that the z-axis frame can pivot about the receiver and move along a z-direction which is perpendicular to the two parallel planes, the seat and the floor are both capable of supporting a human.

2. A method of securing the tree stand of claim 1 to a tree, the method comprising the steps of:

locating a tree and attaching the y-axis frame to the tree via the securing strap.

\* \* \* \* \*